United States Patent [19]

Villa

[11] 4,355,798
[45] Oct. 26, 1982

[54] FILM FEED MAGAZINE FOR EQUIPPING A RADIOGRAPHIC FILM CHANGER AND A FILM-CHANGER EQUIPPED WITH SAID MAGAZINE

[75] Inventor: Francisco Villa, Monza, Italy

[73] Assignee: CGR Compania Generale de Radiologia, Monza, Italy

[21] Appl. No.: 184,056

[22] Filed: Sep. 4, 1980

[30] Foreign Application Priority Data

Sep. 4, 1979 [FR] France .................. 79 22078

[51] Int. Cl.³ .................................. B65H 1/06
[52] U.S. Cl. .................... 271/21; 271/109; 271/165
[58] Field of Search ............ 271/145, 161, 165, 21, 271/109; 250/468, 469, 470, 471

[56] References Cited

U.S. PATENT DOCUMENTS

| | | | |
|---|---|---|---|
| 3,074,713 | 1/1963 | Sano | 250/468 X |
| 3,616,736 | 11/1971 | Bergstrom | 271/161 X |
| 3,720,408 | 3/1973 | Horn | 271/145 X |
| 4,014,536 | 3/1977 | Hope | 271/162 |
| 4,201,919 | 5/1980 | Schmidt | 250/468 |

FOREIGN PATENT DOCUMENTS 472683  6/1969  Switzerland .................. 250/469

*Primary Examiner*—Richard A. Schacher
*Attorney, Agent, or Firm*—Oblon, Fisher, Spivak, McClelland & Maier

[57] ABSTRACT

A radiographic film magazine for receiving stacked films without any intercalary strips and feeding them one by one into a film-changer without any problems of adhesion by means of a spout-shaped receptacle in which the films are retained with a high degree of curvature, thus facilitating extraction of the films. The magazine is intended to equip high-speed film-changers as well as normal selectors provided with a film-gripping mechanism.

4 Claims, 7 Drawing Figures

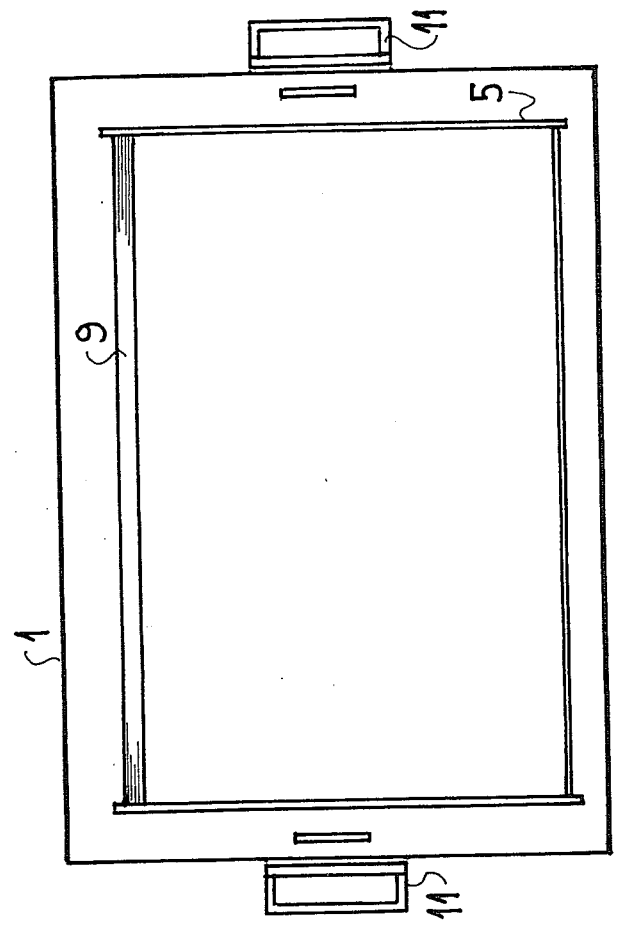
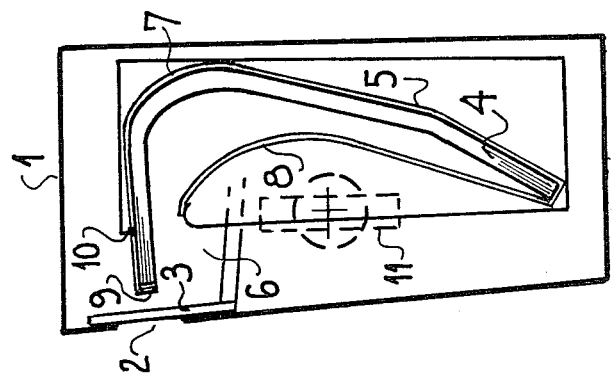

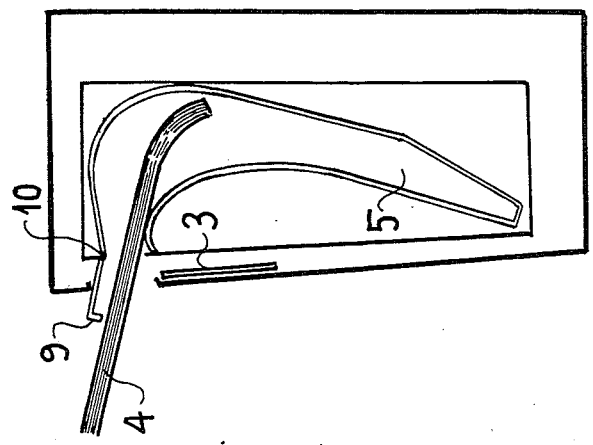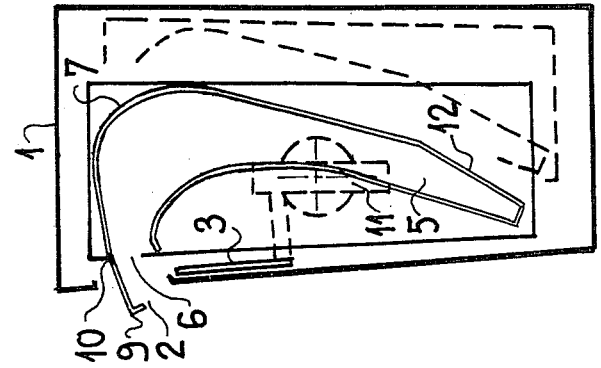

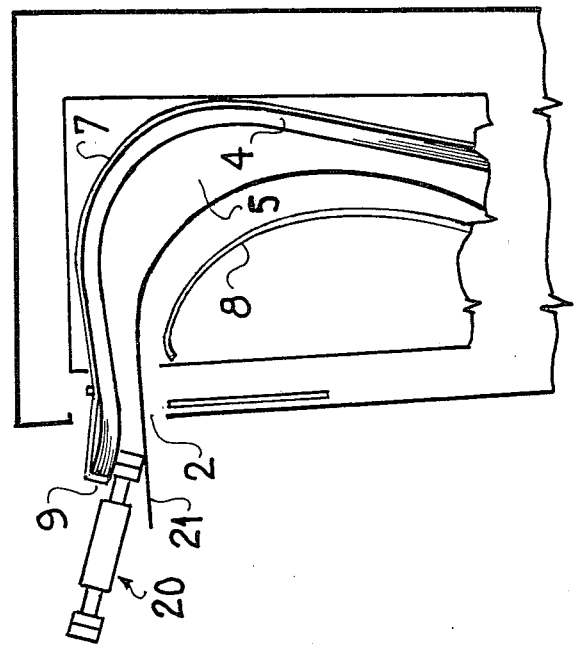

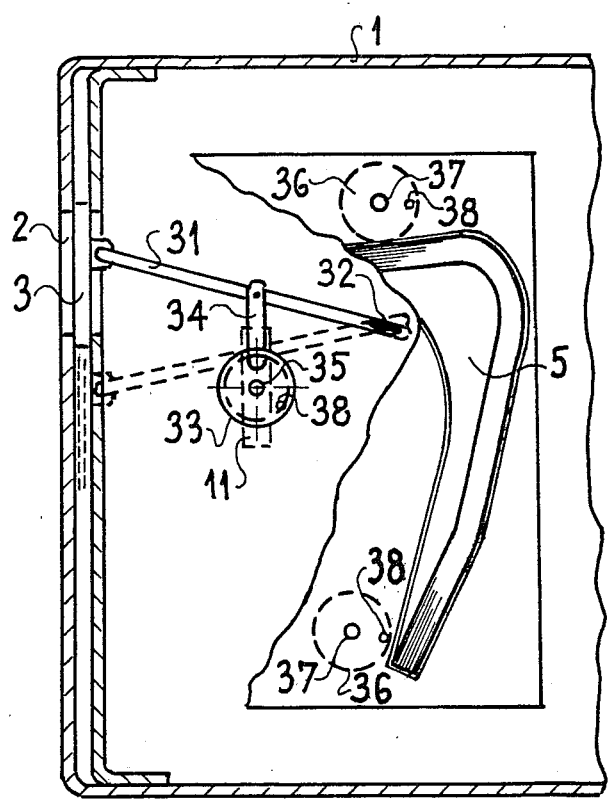
FIG_4

FILM FEED MAGAZINE FOR EQUIPPING A RADIOGRAPHIC FILM CHANGER AND A FILM-CHANGER EQUIPPED WITH SAID MAGAZINE

BACKGROUND OF THE INVENTION

1. Field of the Invention

This invention relates to a film feed magazine which is intended to equip a radiographic film changer and is capable of feeding both high-speed film-changers and normal or low-speed selectors. The film feed magazine in accordance with the present invention can equip any film-changer which is provided with a device for gripping and taking films one by one. One example of this device will be described in greater detail hereinafter.

The invention also relates to a radiographic film changer equipped with a magazine in accordance with the invention.

2. Description of the Prior Art

Different types of feed magazines for radiographic film changers are at present in existence.

In a first type of feed magazine, the films are placed inside the magazine within a darkroom and separated by an intercalated strip. Although it facilitates separation and gripping of films one by one, the intercalated strip clearly has the effect of complicating the introduction of films into the magazine. The operation involved in the introduction of films into the magazine thus takes a very long time and is also liable to damage films by reason of the need to handle them one by one.

In another type of feed magazine, the films are introduced one by one and placed between two rolled sheets of mylar. In this type of magazine, loading can be performed by means of a motor, which is an advantage over the previous type. On the other hand, a disadvantage arises from the static electricity produced by rubbing friction of the films within the mylar.

SUMMARY OF THE INVENTION

The present invention constitutes an improved version of a third type of feed magazine in which the films are introduced directly in the form of a stack without any intercalary strip. This type of magazine clearly offers the advantage of rapid and simple loading. The major disadvantage which is attached to film-changers of this type and which the invention proposes to overcome lies in the fact that adhesions are liable to take place between the films of the stack in the presence of moisture or static electricity phenomena caused by rubbing of one film against the other. Furthermore, in order to ensure more reliable selection and gripping of films one by one, some magazines of this type call for minimum dimensional tolerances of films.

In the film feed magazine according to the present invention, the films are loaded in packets without any intercalary strip, thus facilitating their use. An original structure of the film receptacle will make it possible to remove the problems of frictional contact of films with each other during extraction, thus preventing the phenomenon of electrostatic charges. This structure also makes it possible to avoid any need to ensure that the films have dimensional tolerances.

In accordance with the invention, a film feed magazine for a radiographic film changer, provided with a mechanism for gripping films one by one, essentially includes a light-tight outer casing containing the following elements:

a receptacle for films in packet form, given the shape of an inwardly curved spout which is open at one end;

a movable shutter, the opening of which provides access to the opening of the spout; and a mechanism for displacing the spout-shaped receptacle such that, in a first position or so-called rest position, the receptacle is completely contained within the interior of the outer casing whereas in a second position or so-called "loading and work" position in which the movable shutter is open, the receptacle is moved forward within the casing towards the slot which is freed by the opening of the shutter in such a manner as to ensure that the corresponding end of the packet of films passes out of the slot and is accessible to the mechanism for gripping the films which equip the film-changer.

The original structure of the film receptacle which has the shape of an inwardly curved spout produces a curvature of the films within the magazine. This curvature is advantageously utilized by the film-gripping mechanism which equips the film-changer in order to ensure that, as soon as the film is taken by the gripping mechanism, the film is detached from the stack of films located within the receptacle. As will become apparent hereinafter, this detachment removes all problems of static electricity.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIGS. 1a and 1b are schematic views respectively in cross-section and in a front view showing diagrammatically a feed magazine in accordance with the invention, the magazine being ready to be mounted on the radiographic film changer or filled with a packet of films;

FIGS. 2a and 2b are diagrammatic views of a magazine in accordance with the invention during loading with a packet of films;

FIGS. 3a and 3b are diagrammatic sectional views of a magazine in accordance with the invention at two different stages of extraction of a film by the gripping mechanism of the film-changer which is equipped with the magazine;

FIG. 4 is a slightly more detailed sectional view of a magazine in accordance with the invention and showing diagrammatically the mechanism for operating the movable shutter and the spout-shaped receptacle.

DETAILED DESCRIPTION OF THE PREFERRED EMBODIMENTS

As shown diagrammatically by way of example in FIGS. 1a and 1b, a magazine in accordance with the invention includes a light-tight outer casing 1 having an elongated slot 2 through which the films are introduced. In the so-called "rest" position illustrated in these two figures, the elongated slot is closed by a movable shutter 3, the operation of which will be explained hereinafter.

In accordance with the present invention, a packet 4 of unexposed films stacked directly one above the other is placed within an elongated receptacle 5 having a cross-section in the shape of an inwardly curved spout as shown in FIG. 1a, that end of the receptacle which is located in front of the slot 2 of the outer casing being open at 6. The outer wall 7 of said spout-shaped receptacle has a high degree of curvature in order to ensure that the packet of films which is housed therein also assumes a curved configuration. The inner wall 8 advantageously has a lower degree of curvature than the outer wall 7.

That end of the outer wall 7 which is located in the vicinity of the opening 6 has a flange 9 for retaining the edge of the packet of films in order to apply these latter against the convex outer wall 7 and to maintain them in the curved state. The flanged end of the outer wall is advantageously articulated about a flexible and elastic hinge 10, with the result that the films can be applied by the end portion against the extraction device of the film-changer at the time of use (as shown in FIGS. 3a and 3b) and that introduction of the packet of films (as shown in FIGS. 2a and 2b) is facilitated prior to use.

The mechanism provided for changing over from the "rest" position shown in FIG. 1 in which the shutter 3 is closed and the spout-shaped receptacle 5 is located entirely within the interior of the outer casing 1 to the "loading" position (shown in FIGS. 2a and 2b) or to the "work" position (shown in FIGS. 3a and 3b) in which the shutter 3 is open and the receptacle 5 is withdrawn from the casing 1 to a slight extent are shown in the drawings only very diagrammatically. These change-over or switching mechanisms include a certain number of link-rod systems and disks which will be described with reference to FIG. 4. The mechanisms are actuated from the exterior of the casing 1 by a pivoting handle 11 which advantageously controls at the same time the displacements of the shutter and of the receptacle.

FIGS. 2a and 2b show the procedure involved in loading the magazine with films. It will be readily understood that, prior to any use of the magazine in a film-changer, the loading operation is performed either in a darkroom or within a machine which permits loading in full daylight.

When the magazine has been placed in the loading position by operating the handle 11, the shutter 3 is opened and the receptacle 5 is advanced towards the slot 2 so as to ensure that its opening 6 is readily accessible. The articulated end portion 9 of the receptacle 5 is located, for example, in a position in which it projects from the casing 1 to a slight extent.

Introduction of the packet of films 4 through the opening 6 is facilitated by the articulated end portion 9 and continues until the edge of the films is retained by the flange of the end portion 9.

A point worthy of note is the fact that the curvature of the spout-shaped receptacle and its inclined bottom portion 12 cause the films to slide over each other at the time of introduction and to come into position in a degressive manner. This results in a separation between the films which removes any attendant danger of adhesion when the films are subsequently extracted from the magazine one by one.

FIGS. 3a and 3b are schematic diagrams showing two stages of the magazine during operation in a film-changer provided with a mechanism for taking films one by one. The film-changer has not been shown in these figures and only one possible form of construction of its gripping mechanisms are shown diagrammatically. The device 20 considered here for separating a film 21 from the stack of films 4 has already been described in French Pat. No. 75 17794 filed by Compagnie Generale de Radiologie on June 6, 1975 and published under U.S. Pat. No. 2,313,696. This patent entitled "Device for successive extraction of sheets of films one by one from a stack of films precut to the same size, especially for radiographic film-changing units" describes and claims a strip device (not shown in the accompanying drawings) carried by a disk 22, the rotation of which serves to detach a film 21 from the stack 4.

It will be readily apparent that any type of gripping mechanism for detaching a film 21 from the stack 4 could be employed in the present invention.

As soon as the film 21 has been detached from the stack 4 by the device 20 to a slight extent and is no longer maintained by the flange 9, its elasticity and the initial curvature given to the film by the spout shape of the outer receptacle wall 7 cause the film to move forward within the receptacle 5 as shown in FIG. 3b.

The film is thus separated from the stack of films 4 without friction and without any problems of adhesion and static electricity. Moreover, the stack is already in the advanced position within the magazine opening 2, thus facilitating its transfer within the film-changer, for example by means of feed rollers (not shown in the drawings).

FIG. 4 is a partially cutaway view in cross-section showing a magazine in accordance with the invention and serves to explain the operation of the mechanism employed for opening and closing the shutter 3 and for producing the displacements of the receptacle 5.

The shutter 3 is connected to the lever 31; this latter is pivotally mounted on the outer casing 1 of the magazine by means of the pivot-pin 32. The lever 31 is attached to the disk 33 by means of the lever 34. The disk 33 is engaged with the shaft 35 which is rigidly fixed to the operating handle 11.

When the operating handle 11 is rotated through an angle of 180° by means of the levers, the shutter 3 closes (position shown in full lines) or opens (position shown in dashed lines).

In regard to the spout-shaped receptacle 5, this latter is attached to the outer casing 1 on each side by means of three disks such as those designated by the reference numerals 36 and 33.

The pivots 37 of the disks 36 are fixed on the outer casing 1; the disks 36 are rotatably mounted on the pivots.

The receptacle and its spout 5 are connected to the disks 36 and 33 by means of eccentric pivots 38. During rotation of the operating handle 11 through an angle of 180° corresponding to the opening of the shutter 3, the spout-shaped receptacle 5 changes over to the loading position (or work position) or in other words advances towards the opening 2 of the magazine.

Obviously, numerous modifications and variations of the present invention are possible in light of the above teachings. It is therefore to be understood that within the scope of the appended claims, the invention may be practiced otherwise than as specifically described herein.

What is claimed is:

1. A film feed magazine for a radiographic film changer having means for individually gripping films comprising:

a light-tight outer casing having an elongated slot formed therein;

a receptacle for holding said films in packet form disposed within said outer casing, said receptacle having an inner wall and an outer wall, each defining an arcuate spout-shaped profile, said receptacle having an open end portion for receiving said films in packet form;

a movable shutter operatively associated with said casing for opening and closing said elongated slot such that said opening of said elongated slot provides access to said open end portion of said receptacle;

means operatively associated with said receptacle and said shutter for displacing said receptacle within said outer casing from a first position wherein said receptacle is remotely disposed within said casing with respect to said elongated slot and said movable shutter closes said elongated slot to a second position wherein said receptacle is proximately disposed within said casing with respect to said elongated slot and said movable shutter opens said elongated slot such that an end portion of said films in packet form passes through said elongated slot for access to said means for gripping said films.

2. A film feed magazine according to claim 1 further comprising control means operatively associated with said means for displacing said receptacle and with said movable shutter, said control means ensuring concurrent actuation of said shutter and displacement of said receptacle such that movement of said receptacle from said first position to said second position effects the passage of an end portion of said outer wall adjacent said open end portion of said receptacle through said elongated slot.

3. A film feed magazine according to claim 1 or claim 2, wherein said outer wall further comprises an articulated end portion having a flange for retaining said films in packet form, means for allowing rotation of said articulated portion about an axis parallel to said elongated slot, said means for allowing rotation being connected to said end portion of said outer wall, elastic means for biasing said packet of films towards said open end portion of said receptacle, and elastic means for biasing said packet of films toward said means for gripping said films.

4. A film feed magazine according to claim 1 wherein said means for individually gripping films further comprises rotating means operatively associated with said radiographic film changer for individually detaching said films, and wherein said films further comprise a stack of precut films such that said rotating means individually separates each of said films from said stack.

* * * * *